Oct. 17, 1944.  R. B. COTTRELL  2,360,649
TRUCK
Filed Oct. 4, 1941  2 Sheets-Sheet 1

INVENTOR.
Robert B. Cottrell
BY
ATTORNEY.

Oct. 17, 1944.  R. B. COTTRELL  2,360,649
TRUCK
Filed Oct. 4, 1941  2 Sheets-Sheet 2

INVENTOR.
Robert B. Cottrell
BY Orrin O. B. Farmer
ATTORNEY.

Patented Oct. 17, 1944

2,360,649

UNITED STATES PATENT OFFICE 2,360,649

TRUCK

Robert B. Cottrell, Chicago, Ill., assignor to American Steel Foundries, Chicago, Ill., a corporation of New Jersey Application October 4, 1941, Serial No. 413,601

19 Claims. (Cl. 105—197.2)

My invention relates to railway car trucks and particularly to a form of truck generally designated quick wheel change wherein the side frame and bolster or load carrying members are so tied together as to permit their convenient dismantling for wheel change purposes without disturbing the other parts which may be associated with the side frame or bolster or both.

The general object of my invention is to devise a relatively compact type of quick wheel change truck utilizing a single member as a means of interlocking the side frame and bolster.

A different object of my invention is to design a novel form of bolster and side frame interlocking member so devised as to permit its insertion into a bolster opening of normal width for positioning in guiding engagement with the columns at opposite sides of said opening and wherein each column may be formed with relatively large guide surfaces vertically arranged and interrupted by a vertical slot, within which the interlocking member may have sliding engagement.

My novel interlocking member may comprise a relatively wide horizontal web which may be recessed in the bottom wall of the bolster or load carrying member, a plurality of means interlocking said member with said bolster end, and portions of general wedge shape with arcuate extremities so designed for a purpose to be more particularly described.

My novel truck structure contemplates an arrangement wherein the guide columns may be afforded relatively large bolster guide areas affording adequate wear surfaces and wherein the side frame below the bolster opening may be widened with upstanding flanges defining a spring seat, said upstanding flanges affording tension member reinforcing portions and so permitting a relatively shallow box-section beneath said bolster opening and facilitating the use of relatively long travel springs conducive to easy riding.

A different object of my invention is to devise a novel form of quick wheel change truck utilizing a novel bolster and side frame interlocking member, said interlocking member being so constructed as to permit its entrance into the bolster opening in a diagonal position and rotation into a normal position for interlocking engagement with the columns at opposite sides of the bolster opening, after which the spring group may be inserted therebeneath and the interlocking member seated thereon, said interlocking member being superpositioned in said bolster opening independent of the bolster which may seat thereon.

In the drawings, Figure 1 is a fragmentary side elevation of a car truck embodying my invention and partly cored away to show clearly the position of the interlocking member.

Figure 1:
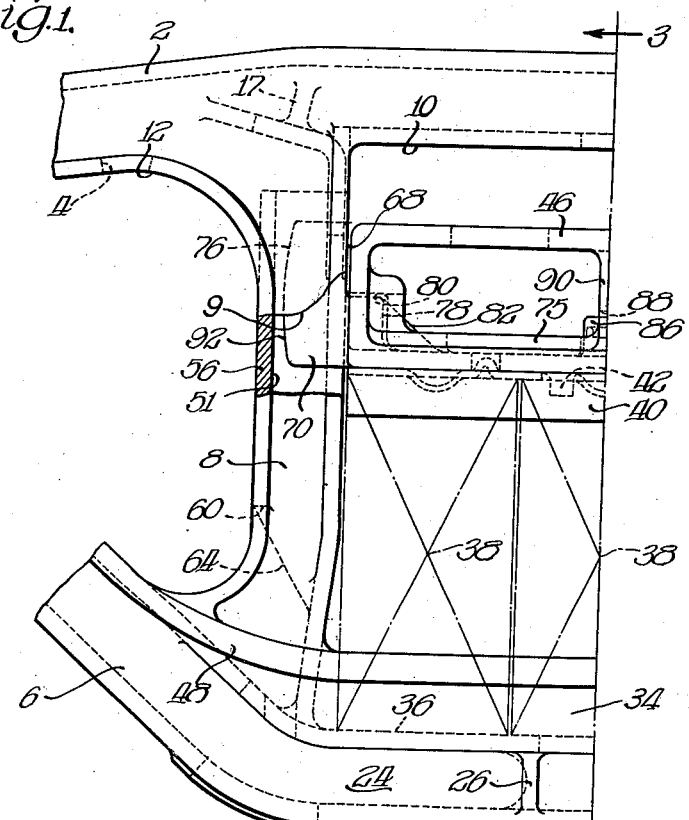

My novel truck structure comprises a side frame having a compression member 2 of general inverted U-section, the lateral webs of which may be joined outwardly of each column by the transverse tie 4, a tension member 6 of U-section, and an integral column 8 merging with said tension and compression member to define the central bolster opening 10 and the adjacent window opening 12. Over the bolster opening the compression member may have a general box-section with a top web 14 and a bottom web 16, a major portion of said bottom web being cored away as indicated at 18 (Figure 2), and merging with said compression member at its juncture with each column may be the usual inboard brake hanger bracket 17. Beneath the bolster opening 10, the tension member may also be of box-section having a bottom web 20, inboard and outboard side walls 22 and 24 reinforced by the vertical ribs 24, 26 and a top chord 28, said box structure being reinforced centrally thereof by the longitudinal rib 30 merging with the top and bottom chords. The top chord 28 may be widened beneath said bolster opening and formed with upstanding inboard and outboard flanges 32 and 34 defining with said top chord a spring seat 36 on which may be positioned spring means comprising coil springs diagrammatically indicated at 38, 38, said spring means comprising a top spring plate 40 affording confining means therefor, said top spring plate being interlocked adjacent the inboard and outboard edges thereof as at 42, 42 with downwardly projecting lugs on the bottom wall 44 of the bolster generally designated 46.

The inboard and outboard upstanding flanges 32, 34 of the tension member may converge at corresponding ends and merge with the lateral edges of the column 8. For a major portion of its length, each column 8 may have the section best indicated in a top plan view of Figure 2 comprising a relatively wide transverse web 50 interrupted centraly thereof by the vertical slot or channel 51, said slot being defined by the converging inboard and outboard walls 52 and 54 merging with the transverse wall 56, said walls terminating at their upper extremity as at 58 (Figure 3) at the lower margin of the opening 59 at the top of each column. The web 56 may be terminated intermediate the column as at 60 (Figure 3) thus defining the top margin of the elongated slot or opening 62 at the bottom of the column, and the side walls 52 and 54 may be diagonally cut away below the margin 60 as best seen at 64 (Figure 1). The main transverse web 50 of each column 8 presents a relatively wide surface inboard and outboard of the central vertical channel 51 as well illustrated in the sectional view of Figure 3, and the upper portion of each surface affords a bolster guiding area 66 which may have guiding engagement as at 68 (Figure 1) with the adjacent side wall of the bolster. It may be noted that the guide surfaces 66, 66 on each column are relatively wide and extend vertically from the top of the bolster opening to adjacent the bottom thereof, the surfaces 66, 66 lying in a single plane and being interrupted by the central channel 51 within which the interlocking member may have vertical slidable movement.

Figure 2:
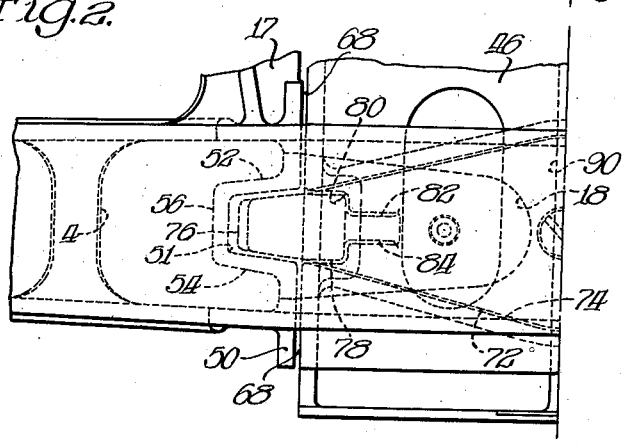
Figure 2 is a fragmentary top plan view of the truck structure shown in Figure 1.
Figure 3:
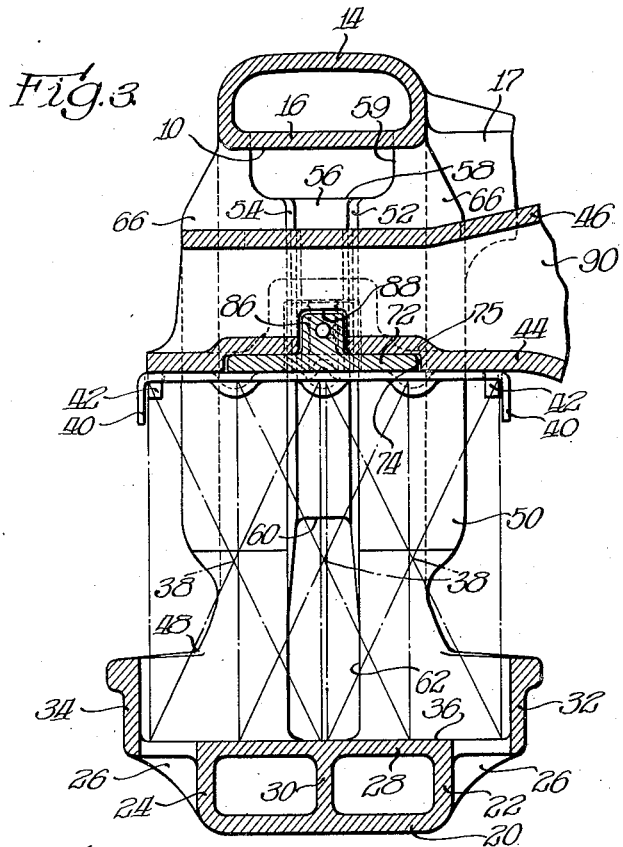
Figure 3 is a fragmentary sectional view taken substantially in the transverse vertical plane bisecting the truck and as indicated by the line 3—3 of Figure 1.

The bolster 46 may be retained in normal relationship with the side frame by means of the insert or interlocking member generally designated 70, said interlocking member having a bottom web 72 widest at the center and tapering toward the opposite ends thereof as best seen in the top plan view of Figure 2, said bottom web 72 being recessed in the bottom wall of the bolster in the shallow recess 74 defined therein by an offset portion 75 in the wall 44 of said bolster. The interlocking member 70 is formed with upstanding end portions 76, 76 each in the form of a solid body of metal somewhat wedge shape in the transverse section as best seen in the plan view of Figure 2, each end portion having a depth substantially equal to that of the adjacent bolster end and each end portion 76 may have adjacent the base thereof a rectangular lug 78 recessed as at 80 in the adjacent side wall of the bolster for interlocking engagement therewith, said lug 78 being reinforced by the diagonal rib 82, said rib extending through the slot 84 (Figure 2) formed in the side wall and the bottom wall of the bolster end thus affording additional interlocking of the insert with the bolster end. Centrally of the insert interlocking member 70 may be formed the upstanding lug 86 which may project through an opening in the bottom wall 44 of the bolster within the slot 88 formed in the central vertical rib 90 of said bolster, and the lug 86 may be perforated for reception of a cotter key or other convenient securing means serving to key the interlocking member 70 after assembly.

Figure 4:
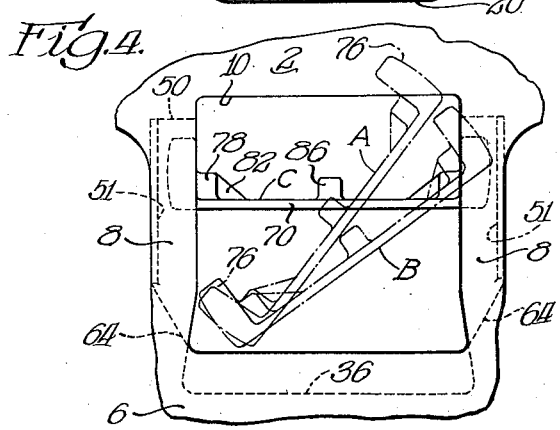
Figure 4 illustrates the manner of inserting my novel form of bolster and side frame interlocking member into the bolster opening of the side frame and rotational movement thereof into normal operative position.

In Figure 4 I have shown somewhat diagrammatically the manner of assembling my novel insert interlocking member into the bolster opening 10 of my novel form of side frame. Before the spring group is assembled in said side frame, said interlocking member may be mounted therein first placing it in the diagonal position indicated at A with one end in a lower corner of the bolster opening 10 and the other opposite end in the diagonally opposite upper corner thereof, said interlocking member being aligned in said bolster opening with the vertical slots 51, 51 in the columns at opposite sides thereof so that the end portions 76, 76 may be received in the slots 51, 51 as the interlocking member is rotated first into the position indicated at B and finally into its normal level operative position indicated at C. In this position the insert interlocking member may be elevated to the top of the bolster opening and spring means placed in position therebeneath on the spring seat at the bottom of said opening, after which the interlocking member may be lowered into normal position atop said spring means with the end portions 76, 76 in complementary interlocking engagement with the channels 51, 51 in the respective columns. Thus, when in normal position the interlocking member is permitted vertical movement in said slots but is restrained against lateral movement. Some play may be permitted the interlocking member with respect to the side frame. As already noted each end portion 76 of the interlocking member is crowned at its extremity as best seen at 92 along a radius suitable to facilitate the assembling or dismantling of said interlocking bar in the manner just described.

In my novel arrangement, quick wheel change is facilitated by the fact that the bolster end may be elevated above the interlocking member and the spring group which may remain in normal position thereunder, the bolster end having vertical clearance from the bottom web of the compression member sufficient to permit said bolster end to be elevated and to clear the interlocking member when the spring means thereunder has assumed its normal expanded height sometimes designated free height.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck of quick wheel change type, a truss side frame having a tension member, a compression member, and integral columns defining therewith a central bolster opening and spaced window openings, said tension member having a box-section beneath said bolster opening with the top chord widened and formed with upstanding flanges defining a spring seat, said compression member having a box-section over said bolster opening with the bottom chord cored away adjacent each column, each of said columns having inboard and outboard bolster guide surfaces lying in a single plane and an intervening vertical channel, a spring group on said spring seat, a bolster end projecting into said bolster opening and a member having a portion recessed in the bottom wall of said bolster and upstanding ends of approximately the same height as said bolster end and recessed in the channels of respective columns for interlocking engagement therewith, and means tying together said bolster end and said interlocking member, said interlocking member being irremovable from said bolster opening when said spring group is in normal position.

2. In a railway car truck of quick wheel change type, a truss side frame having a tension member, a compression member, and integral columns defining therewith a central bolster opening and spaced window openings, said tension member having a box-section beneath said bolster opening with the top chord widened and formed with upstanding flanges defining a spring seat, said compression member having a box-section over said bolster opening with the bottom chord cored away adjacent each column, each of said columns having inboard and outboard bolster guide surfaces lying in a single plane and an intervening vertical channel, a spring group on said spring seat, a bolster end projecting into said bolster opening and a member having a portion recessed in the bottom wall of said bolster end and upstanding ends recessed in the channels of respective columns for interlocking engagement therewith, and means tying together said bolster end and said interlocking member, said interlocking member having a length greater than the width of said bolster opening and being insertable in diagonal position and rotatable therein in the plane of said frame to normal operative position, said upstanding ends being vertically crowned on the surfaces thereof remote from the bolster.

3. In a car truck, a truss side frame having tension and compression members and spaced columns defining a bolster opening, each of said columns having a plane vertical bolster guide surface interrupted centrally thereof by a vertical channel, said tension member being of box section beneath said bolster opening with the top chord widened and formed with upstanding flanges defining a spring seat, a spring group on said tension member in said opening, a bolster end seated on said spring group, and an interlocking member with portions recessed in the bottom wall and side walls of said bolster end, said interlocking member having its extremities recessed in said vertical channels and having a length greater than the width or depth of said opening but being diagonally insertable therein and rotatable in the plane of said frame to normal horizontal position, the portions of said interlocking member recessed in said bolster end having a depth less than the vertical clearance between said bolster end and said compression member thereover to permit dismantling of the bolster end from said compression member while said interlocking member and said spring group remain in normal position therein, said interlocking member constituting the sole means tying said frame to said bolster end.

4. In a side frame of truss type, a compression member, a tension member and integral columns defining therewith a bolster opening and spaced window openings, said bolster opening having a generally rectangular form of greater width than depth, each of said columns presenting coplanar bolster guide surfaces and an intervening vertical channel, the central portions of said columns and adjacent portions of said compression member being cored away adjacent the top of each column to afford clearance for an associated bolster interlocking member, said bolster interlocking member having a length greater than the width of said bolster opening and being diagonally insertable therein with an end within said compression member and rotatable within the plane of said frame to normal horizontal position with vertically crowned ends interlocked with the respective columns, each of said channels being defined by flaring side walls and said interlocking member having end portions with complementary faces for engagement with said side walls.

5. In a railway car truck of quick wheel change type, a truss side frame having a tension member, a compression member, and integral columns defining therewith a central bolster opening and spaced window openings, said tension member having a box-section beneath said bolster opening with the top chord widened and formed with upstanding flanges defining a spring seat, said compression member having a box-section over said bolster opening with the bottom chord cored away adjacent each column, each of said columns having inboard and outboard bolster guide surfaces lying in a single plane and an intervening vertical channel, a spring group on said spring seat, a bolster end projecting into said bolster opening and a member having a portion recessed in the bottom wall of said bolster end and upstanding ends vertically curved on the edges thereof remote from said bolster end and recessed in the channels of respective columns for interlocking engagement therewith, and means tying together said bolster end and said interlocking member.

6. In a cast steel side frame of truss type, a compression member, a tension member and spaced integral colmuns defining a bolster opening and window openings at opposite sides thereof, said tension member being of box section beneath said bolster opening with the top chord widened and formed with upstanding flanges defining a spring seat, said bolster opening having a substantially rectangular form of greater width than depth, said compression member having a box-section over said bolster opening with the bottom chord thereof cored away adjacent each colmun, each of said columns having a bolster guide surface interrupted centrally thereof by a vertical channel, said channel being defined by side walls and a transverse web terminating above and below said tension and compression members respectively, and an associated interlocking member having a length greater than the width of said bolster opening and being diagonally insertable therein with an end in said compression member and being rotatable in the plane of said frame within said bolster opening to normal horizontal position with the ends thereof engaged in said channels respectively, said ends veing vertically curved to facilitate the rotatable movement of said interlocking member.

7. An insert member for interlocking a bolster and side frame of a railway car truck comprising a flat web adapted to be engaged with the bottom of the bolster, and upstanding end portions vertically curved on the edges thereof remote from said bolster, said end portions being formed and arranged for interlocking engagement with said frame, said member being of substantially the same length at the top and bottom thereof and said end portions comprising on opposite sides thereof substantially rectangular bearing areas, and a rectangular thrust transmitting lug formed on the top of said web at its juncture with each of said end portions.

8. An insert member for interlocking a bolster and side frame comprising a flat web with interlocking means for cooperation with the bottom of said bolster, and upstanding end portions vertically curved on the edges thereof remote from said bolster, said member being of substantially the same length at the top and bottom thereof, and each of said end portions comprising on opposite sides thereof substantially rectangular bearing areas converging toward the adjacent extremity of said member.

9. In a railway car truck, a side frame comprising tension and compression members and spaced columns defining therewith a bolster opening, said compression member being of box section above said bolster opening with the bottom chord of said box section cored away adjacent each column, said tension member being of box section beneath said opening with the top chord widened and formed with upstanding flanges defining a spring seat, a vertical channel in each column, resilient means on said seat, an interlocking member seated on said means and having end portions recessed in respective channels, and a bolster end supported on and interlocked with said interlocking member, said interlocking member being of substantially the same length at the top and bottom thereof and said end portions being vertically curved on their remote edges and presenting substantially rectangular inboard and outboard bearing surfaces for cooperation with the inboard and outboard margins of said channels.

10. In a side frame of truss type, a compression member, a tension member and integral columns defining therewith a bolster opening and spaced window openings, said tension member being of box section beneath said bolster opening with the top chord widened and formed with upstanding flanges defining a spring seat, said bolster opening having a generally rectangular form of greater width than depth, each of said columns presenting a plane bolster guide surface interrupted centrally thereof by a vertical channel, the central portions of said columns and adjacent portions of said compression member being cored away adjacent the top of each column to afford clearance for an associated bolster interlocking member, said bolster interlocking member having a length greater than the width of said bolster opening and being diagonally insertable therein with an end within said compression member and rotatable within the plane of said frame to normal horizontal position with ends interlocked with the respective columns, the ends of said interlocking member being vertically curved to facilitate rotatable movement thereof.

11. In a railway car truck, a side frame comprising tension and compression members and spaced columns defining therewith a bolster opening, said compression member being of box section above said bolster opening with the bottom chord of said box section cored away adjacent each column, said tension member being of box section beneath said opening with the top chord widened and formed with upstanding flanges defining a spring seat, a vertical channel in each column, resilient means on said seat, an interlocking member seated on said means and having end portions recessed in respective channels, and a bolster end supported on said resilient means and interlocked with said interlocking member, the length of said interlocking member being greater than the distance between said top and bottom chords, said interlocking member being of substantially the same length at the top and bottom thereof and said end portions presenting substantially rectangular bearing surfaces for cooperation with the inboard and outboard margins of said channels, said bearing surfaces being of substantially the same height as that of said bolster end.

12. In a railway car truck, a side frame comprising tension and compression members and spaced columns defining therewith a bolster opening, said compression member being of box section above said bolster opening with the bottom chord of said box section cored away adjacent each column, said tension member being of box section beneath said opening with the top chord widened and formed with upstanding flanges defining a spring seat, a vertical channel in each column, resilient means on said seat, an interlocking member seated on said means and having end portions recessed in respective channels, and a bolster end supported on said resilient means and interlocked with said interlocking member, the length of said interlocking member being greater than the distance between said top and bottom chords, said end portions being vertically crowned on the surfaces thereof remote from said bolster end, said interlocking member being of substantially the same length at the top and bottom thereof and said end portions presenting substantially rectangular bearing surfaces for cooperation with the inboard and outboard margins of said channels, said bearing surfaces being of substantially the same height as that of said bolster end.

13. In a railway car truck, a side frame comprising tension and compression members and spaced columns defining therewith a bolster opening, said compression member being of box section above said bolster opening with the bottom chord of said box section cored away adjacent each column, said tension member being of box section beneath said opening with the top chord widened and formed with upstanding flanges defining a spring seat, a substantially vertical channel in each column, resilient means on said seat, an interlocking member seated on said means and having end portions recessed in respective channels, and a bolster end supported on said resilient means and interlocked with said interlocking member, said interlocking member being the sole means tying said bolster to said frame and being of greater length than the distance between said top and bottom chords, and said end portions presenting on the inboard and outboard sides thereof bearing surfaces of substantially the same height as the bolster end for cooperation with the inboard and outboard margins of said channels.

14. In a railway car truck, a side frame comprising tension and compression members and spaced columns defining therewith a bolster opening, each column presenting substantially co-planar bolster guide surfaces and an intervening substantially vertical channel, resilient means on said tension member, an interlocking member seated on said means and having end portions recessed in respective channels, and a bolster end supported on said resilient means and interlocked with said interlocking member, said interlocking member being the sole means tying said bolster end to said frame and said interlocking member being of substantially the same length at the top and bottom thereof, said end portions presenting substantially rectangular bearing surfaces for cooperation with the inboard and outboard margins of said columns, said bearing surfaces being of substantially the same height as that of said bolster end.

15. In a railway car truck, a side frame comprising tension and compression members and spaced columns defining therewith a bolster opening, said compression member being of box section above said bolster opening with the bottom chord of said box section cored away adjacent each column, said tension member being of box section beneath said opening with the top chord widened and formed with upstanding flanges defining a spring seat, each column presenting substantially coplanar bolster guide surfaces and an intervening substantially vertical channel, resilient means on said seat, an interlocking member seated on said means and having end portions recessed in respective channels, and a bolster end supported on said resilient means and interlocked with said interlocking member, the length of said interlocking member being greater than the distance between said top and bottom chords, said end portions being vertically crowned on the surfaces thereof remote from said bolster end, said interlocking member being of substantially the same length at the top and bottom thereof and said end portions presenting substantially rectangular bearing surfaces for cooperation with the inboard and outboard margins of said columns, said bearing surfaces being of substantially the same height as that of said bolster end.

16. In a railway car truck, a side frame comprising tension and compression members and spaced columns defining therewith a bolster opening, said compression member being of box section above said bolster opening with the bottom chord of said box section cored away adjacent each column, said tension member being of box section beneath said opening with the top chord widened and formed with upstanding flanges defining a spring seat, a substantially vertical channel in each column, resilient means on said seat, an interlocking member seated on said means and having end portions recessed in respective channels, and a bolster end supported on said resilient means and interlocked with said interlocking member, said interlocking member being the sole means tying said bolster to said frame and being of greater length at the top and bottom thereof than the distance between said top and bottom chords, and said end portions presenting on the inboard and outboard sides thereof bearing surfaces of substantially the same height as the bolster end for cooperation with the inboard and outboard margins of said channels, the edges of said end portions remote from said bolster end being vertically crowned.

17. In a side frame for a railway car truck, tension and compression members and spaced columns dening therewith a bolster opening, said compression member being of box section over said opening with the bottom chord of said box section being relieved adjacent each column, said tension member being of box section beneath said bolster opening with the top chord widened and formed with upstanding flanges defining a spring seat, resilient means on said seat, each of said columns presenting spaced coplanar bolster guide surfaces and an intervening substantially vertical channel, and a bolster interlocking member on said resilient means with end portions received within respective of said channels, said interlocking member being of greater length than the distance between said top and bottom chords, said end portions being vertically crowned on the edges of said end portions remote from each other, said interlocking member being of substantially the same length at the top and bottom thereof and said end portions presenting substantially rectangular bearing surfaces for cooperation with the inboard and outboard margins of said channels.

18. In a side frame for a railway car truck, tension and compression members and spaced columns defining therewith a bolster opening, resilient means on said tension member in said opening, substantially vertical channels in respective columns, and a bolster interlocking member comprising a flat web seated on said means and affording a seat for an associated bolster, said member comprising end portions upstanding from said web and vertically curved on the remote edges thereof, said member being of substantially the same length at the top and bottom thereof, and said end portions being received within respective channels and comprising on opposite sides thereof substantially rectangular bearing areas for cooperation with the inboard and outboard margins of said channels.

19. An insert member for interlocking a bolster and a side frame of a railway car truck comprising a flat web adapted to be engaged with the bottom of the bolster, and upstanding end portions vertically curved on the edges thereof remote from said bolster and formed and arranged for interlocking engagement with said frame, said member being of substantially the same length at the top and bottom thereof and said end portions comprising on opposite sides thereof substantially rectangular bearing areas.

ROBERT B. COTTRELL.

CERTIFICATE OF CORRECTION.

October 17, 1944.

Patent No. 2,360,649.

ROBERT B. COTTRELL.

It is hereby certified that error appears in the printed specification of the above numbered patent requiring correction as follows: Page 1, second column, line 37, for "24, 26" read --26, 26--; page 2, first column, line 5, for "centraly" read --centrally--; and second column, line 62, claim 1, after "bolster" insert the word --end--; page 3, second column, line 23, claim 6, for "colmuns" read --columns--; line 45, same claim, for "veing" read --being--; page 5, first column, line 47, claim 17, for "dening" read --defining--; and that the said Letters Patent should be read with this correction therein that the same may conform to the record of the case in the Patent Office.

Signed and sealed this 14th day of August, A. D. 1945.

Leslie Frazer (Seal)

First Assistant Commissioner of Patents.